(12) United States Patent
Fernandez Orellana et al.

(10) Patent No.: US 11,647,153 B1
(45) Date of Patent: May 9, 2023

(54) COMPUTER-IMPLEMENTED METHOD, DEVICE, AND COMPUTER PROGRAM PRODUCT

(71) Applicant: Dell Products L.P., Round Rock, TX (US)

(72) Inventors: Pedro Fernandez Orellana, Shanghai (CN); Qiang Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/665,649

(22) Filed: Feb. 7, 2022

(30) Foreign Application Priority Data

Dec. 31, 2021 (CN) .......................... 202111657222.7

(51) Int. Cl.
*H04N 7/01* (2006.01)
*G06V 10/774* (2022.01)
*G06V 20/40* (2022.01)

(52) U.S. Cl.
CPC .......... *H04N 7/0117* (2013.01); *G06V 10/774* (2022.01); *G06V 20/46* (2022.01); *G06V 20/49* (2022.01)

(58) Field of Classification Search
CPC ...... H04N 7/0117; G06V 20/49; G06V 20/46; G06V 10/774
See application file for complete search history.

(56) References Cited

U.S. PATENT DOCUMENTS 6,507,615 B1 * 1/2003 Tsujii ................... H04N 19/177
375/E7.181

11,562,121 B2 * 1/2023 Bikumala ............. G06F 40/216
(Continued)

FOREIGN PATENT DOCUMENTS

CN 114466192 A * 5/2022 ........... G06T 3/4046
GB 2600787 A * 5/2022 ........... G06T 3/4046
(Continued)

OTHER PUBLICATIONS

S. Y. Kim, J. Lim, T. Na and M. Kim, "Video Super-Resolution Based on 3D-CNNS with Consideration of Scene Change," 2019 IEEE International Conference on Image Processing (ICIP), Taipei, Taiwan, 2019, pp. 2831-2835, doi: 10.1109/ICIP.2019.8803297. (Year: 2019).*

(Continued)

*Primary Examiner* — Michael Robert Cammarata
(74) *Attorney, Agent, or Firm* — Ryan, Mason & Lewis, LLP

(57) ABSTRACT

Embodiments of the present disclosure relate to a computer-implemented method, a device, and a computer program product. A method includes: determining a first group of frames corresponding to a first scene and a second group of frames corresponding to a second scene different from the first scene in a reference video, respectively. The first group of frames and the second group of frames each have a first resolution. The method further includes determining a first model for the first scene and a second model for the second scene, respectively. The first model and the second model are respectively used to convert frames corresponding to the first scene and the second scene from the first resolution to a second resolution different from the first resolution. The method further includes training the first model and the second model using the first group of frames and the second group of frames, respectively.

20 Claims, 7 Drawing Sheets

(56) References Cited

U.S. PATENT DOCUMENTS

| | | | |
|---|---|---|---|
| 2012/0300122 A1* | 11/2012 | Liu | H04N 7/0137 348/E7.003 |
| 2017/0132758 A1* | 5/2017 | Paluri | G06V 10/454 |
| 2018/0139458 A1* | 5/2018 | Wang | H04N 19/17 |
| 2018/0232853 A1* | 8/2018 | Kim | G06T 3/4007 |
| 2018/0295320 A1* | 10/2018 | Breternitz | H04L 63/0428 |
| 2018/0342045 A1* | 11/2018 | Lutz | G06T 3/4046 |
| 2019/0130530 A1 | 5/2019 | Schroers et al. | |
| 2020/0162789 A1* | 5/2020 | Ma | H04N 21/440263 |
| 2021/0136320 A1* | 5/2021 | Zatloukal | G06V 20/49 |
| 2021/0160512 A1* | 5/2021 | Liu | H04N 21/23655 |
| 2022/0138902 A1* | 5/2022 | Lea | H04L 65/764 382/299 |
| 2023/0013085 A1* | 1/2023 | Choi | H04N 19/46 |
| 2023/0027981 A1* | 1/2023 | Chen | H04N 21/234363 |

FOREIGN PATENT DOCUMENTS

| | | | |
|---|---|---|---|
| KR | 20230007717 A * | 1/2023 | |
| WO | WO-2022093053 A1 * | 5/2022 | |

OTHER PUBLICATIONS

A. Kappeler, S. Yoo, Q. Dai and A. K. Katsaggelos, "Super-resolution of compressed videos using convolutional neural networks," 2016 IEEE International Conference on Image Processing (ICIP), Phoenix, AZ, USA, 2016, pp. 1150-1154, doi: 10.1109/ICIP. 2016.7532538. (Year: 2016).*

Anwar, Saeed, Salman Khan, and Nick Barnes. "A deep journey into super-resolution: A survey." ACM Computing Surveys (CSUR) 53.3 (2020): 1-34. (Year: 2020).*

S. M. Satti, M. Obermann, R. Bitto, C. Schmid and M. Keyhl, "Low Complexity "Smart" Per-Scene Video Encoding," 2019 Eleventh International Conference on Quality of Multimedia Experience (QoMEX), Berlin, Germany, 2019, pp. 1-3, doi: 10.1109/QoMEX. 2019.8743197. (Year: 2019).*

Wikipedia, "Google Stadia," https://en.wikipedia.org/wiki/Google_Stadia, Aug. 11, 2021, 15 pages.

Wikipedia, "Video Super Resolution," https://en.wikipedia.org/wiki/Video_Super_Resolution, Jun. 27, 2021, 18 pages.

Amazon Web Services, "AI Video Super Resolution," https://www.amazonaws.cn/en/solutions/ai-super-resolution-on-aws/, Feb. 2020, 6 pages.

Wikipedia, "GeForce Now," https://en.wikipedia.org/wiki/GeForce_Now, Jun. 6, 2021, 5 pages.

Wikipedia, "Xbox Cloud Gaming," https://en.wikipedia.org/wiki/Xbox_Cloud_Gaming, Aug. 9, 2021, 7 pages.

C. Faulkner, "Microsoft's xCloud game streaming is now widely available on iOS and PC," https://www.theverge.com/2021/6/28/22554267/microsoft-xcloud-game-streaming-xbox-pass-ios-iphone-ipad-pc, Jun. 28, 2021, 4 pages.

Wikipedia, "Nvidia Shield TV," https://en.wikipedia.org/wiki/Nvidia_Shield_TV, Jun. 24, 2021, 3 pages.

U.S. Appl. No. 17/400,350 filed in the name of Qiang Chen et al. Aug. 12, 2021, and entitled "Method, Electronic Device, and Computer Program Product for Video Processing."

U.S. Appl. No. 17/572,203 filed in the name of Pedro Fernandez Orellana et al. Jan. 10, 2022, and entitled "Method, Electronic Device, and Computer Program Product for Video Processing.".

* cited by examiner

COMPUTER-IMPLEMENTED METHOD, DEVICE, AND COMPUTER PROGRAM PRODUCT

RELATED APPLICATION(S)

The present application claims priority to Chinese Patent Application No. 202111657222.7, filed Dec. 31, 2021, and entitled "Computer-Implemented Method, Device, and Computer Program Product," which is incorporated by reference herein in its entirety.

Field

Embodiments of the present disclosure relate generally to the field of computers, and specifically to a computer-implemented method, a device, and a computer program product for computer implementation.

Background

Today, video content accounts for a large proportion of global Internet business. In processes such as transmission and storage of video content, it is often necessary to convert original video content to low-resolution video by techniques such as compression to save resources such as transmission and storage. In addition, there is also a need to reconstruct the low-resolution video into a high-resolution video at a client terminal of a user for use by the user, such as viewing. At present, it has been proposed to apply artificial intelligence-based video processing techniques to various video processing tasks, such as video compression, reconstruction, and so on. The quality and efficiency of video reconstruction affect the user's experience. Therefore, it is expected that the quality and efficiency of video reconstruction can be improved.

Summary

In a first aspect of the present disclosure, a computer-implemented method is provided. This method includes: determining a first group of frames corresponding to a first scene and a second group of frames corresponding to a second scene different from the first scene in a reference video, respectively. The first group of frames and the second group of frames each have a first resolution. This method further includes: determining a first model for the first scene and a second model for the second scene, respectively. The first model and the second model are respectively used to convert frames corresponding to the first scene and the second scene from the first resolution to a second resolution different from the first resolution. This method further includes: training the first model and the second model using the first group of frames and the second group of frames, respectively.

In a second aspect of the present disclosure, a computer-implemented method is provided. This method includes: acquiring an input video; and determining a first group of input frames corresponding to a first scene and a second group of input frames corresponding to a second scene different from the first scene in the input video, respectively. The first group of input frames and the second group of input frames each have a first resolution. This method further includes: determining a trained first model for the first scene and a trained second model for the second scene, respectively. The trained first model and the trained second model are trained based on the method described according to the first aspect of the present disclosure. This method further includes: generating, based on the first group of input frames and according to the trained first model, a first group of output frames having a second resolution different from the first resolution; and generating, based on the second group of input frames and according to the trained second model, a second group of output frames having the second resolution.

In a third aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions including: determining a first group of frames corresponding to a first scene and a second group of frames corresponding to a second scene different from the first scene in a reference video, respectively. The first group of frames and the second group of frames each have a first resolution. The actions further include: determining a first model for the first scene and a second model for the second scene, respectively. The first model and the second model are respectively used to convert frames corresponding to the first scene and the second scene from the first resolution to a second resolution different from the first resolution. The actions further include: training the first model and the second model using the first group of frames and the second group of frames, respectively.

In a fourth aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions including: acquiring an input video; and determining a first group of input frames corresponding to a first scene and a second group of input frames corresponding to a second scene different from the first scene in the input video, respectively. The first group of input frames and the second group of input frames each have a first resolution. The actions further include: determining a trained first model for the first scene and a trained second model for the second scene, respectively. The trained first model and the trained second model are trained based on the method described according to the first aspect of the present disclosure. The actions further include: generating, based on the first group of input frames and according to the trained first model, a first group of output frames having a second resolution different from the first resolution; and generating, based on the second group of input frames and according to the trained second model, a second group of output frames having the second resolution.

In a fifth aspect of the present disclosure, a computer program product is provided. The computer program product is tangibly stored on a computer-readable medium and includes machine-executable instructions that, when executed by a machine, cause the machine to perform any step of the method described according to the first aspect or the second aspect of the present disclosure.

It should be noted that this Summary is provided to introduce a selection of concepts in a simplified manner, which will be further described in the Detailed Description below. The Summary is neither intended to identify key features or major features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent, where.

In all the drawings, the same or similar reference numerals represent the same or similar elements.

DETAILED DESCRIPTION

Figure 1:
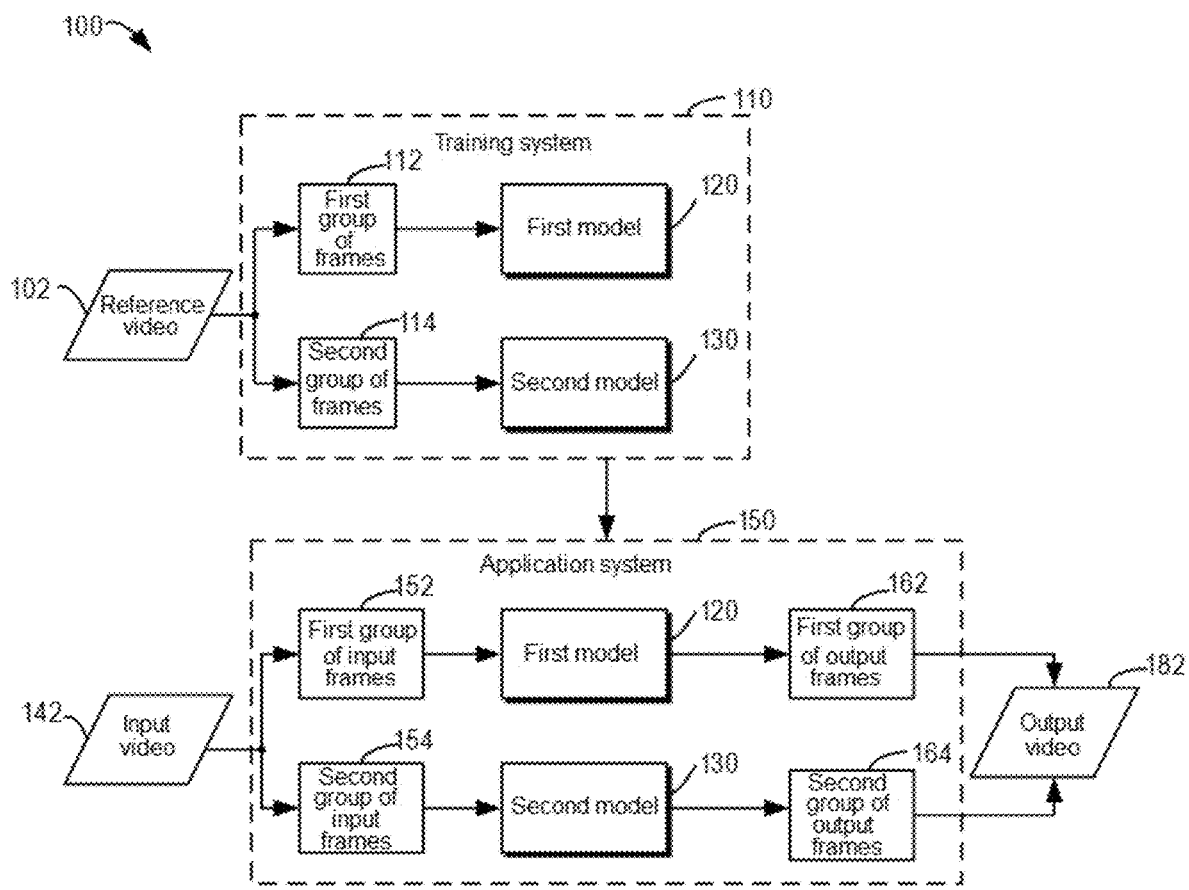
FIG. 1 illustrates a schematic diagram of an example environment in which embodiments of the present disclosure may be implemented.

Embodiments of the present disclosure will be described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are examples only and are not intended to limit the scope of protection of the present disclosure.

The term "include" and its variants as used herein mean open-ended inclusion, i.e., "including but not limited to." The term "based on" is "based at least in part on." The term "one embodiment" means "at least one embodiment." The term "another embodiment" means "at least one further embodiment." Relevant definitions of other terms will be given in the description below.

As used herein, the term "model" encompasses an arrangement configured to learn a correlation between corresponding inputs and outputs from training data, so that a corresponding output can be generated for a given input after the training is completed. The generation of a model can be based on machine learning technologies. Deep learning is a machine learning algorithm that uses multiple layers of processing units to process inputs and provide corresponding outputs. The neural network model is an example of a model based on deep learning. Herein, "model" may also be referred to as "machine learning model," "learning model," "machine learning network," or "learning network," and these terms are used interchangeably herein.

As used herein, the term "Video Super Resolution (VSR)" refers to the construction or reconstruction of video data having a high resolution (e.g., original resolution) from (e.g., compressed) video data having a low resolution through technical means. A compressed video is much smaller than an original video (e.g., a ×4 reduction of frames in the video may roughly reduce the video to 1/16 of the original video size). As a result, in multiple fields related to video (e.g., video transmission and streaming, video conferencing, remote gaming, etc.), a video with a lower resolution is often transmitted or stored and, when needed, a video with a higher resolution is reconstructed in combination with the VSR technology.

In application fields such as VSR, a conversion model (e.g., a deep neural network-based model) is often used for conversion between different resolution versions of a video. In order to train the model to determine the conversion parameter of the model, etc., video frames containing scenes and visual patterns need to be provided as training data so that the model can learn how to convert (e.g., reconstruct) various features therein.

In some conventional model training solutions, a large amount of different training data (e.g., a large amount of different video content) is usually used, which makes the model more generalizable. However, this solution makes the training process complex and the training difficult to converge due to the large amount of training data. Moreover, the resulting trained models are usually large. When using such a model for restoration processing on a video, dedicated hardware (e.g., a high-performance graphics processing unit (GPU)) is required to perform the restoration processing. Therefore, this also leads to an increase in the cost of hardware configuration.

Several model training solutions have been proposed to extract all frames from both a high-resolution version (e.g., the original version) and a low-resolution version (e.g., the compressed version) of the same video content and generate pairs of high-resolution frames and low-resolution frames as samples in the training data. This solution is more suitable for video content of a short duration. However, for video content of a long duration with complex scenes, dedicating the entire video content for training requires a large quantity of computational resources and a long training time.

For example, a medium-sized video contains tens of thousands of frames (e.g., 10 minutes at 60 frames/sec=36,000 frames), and a large-sized video/movie contains hundreds of thousands of frames. The original format of these frames may possibly take up as much as 100 GB of storage space. It may possibly take hours to train all the original frames extracted from the video just once (pass/epoch), while a full training cycle usually requires tens or even hundreds of training passes. For this, high-end graphics processors and large memory and storage space clusters are required.

In addition, the models compete with each other for learning different segments of video content. For example, for video content with multiple complex scenes, if a model is desired to learn or adapt better to frames corresponding to a scene, that model will be caused to adapt less well to frames of other scenes. In addition, this solution also suffers from the problem of detail dilution. If the number of frames is small, the model is easily overfitted in detail. Conversely, if the number of frames is higher, most of the details have less chance to be learned effectively (i.e., harder to learn and easier to forget).

Moreover, for this conventional solution, to improve the quality of video reconstruction, it is necessary to use a higher-capacity or larger-sized model, for example, using a model with more parameters. However, since larger models will be more difficult to train, there is no guarantee of obtaining better quality. In addition, larger models require more computational resources, which may also affect the performance and efficiency of training and reconstruction. For example, larger models require GPUs with more memory for training and application, and may result in lower frame rates during video reconstruction.

In summary, there is a lack of effective solutions of training models for improving the quality and efficiency of video reconstruction. According to an embodiment of the present disclosure, a solution for model training is provided. This solution divides a video into different frame groups according to different scenes. For different scenes, different models are trained using the frame groups associated with the scenes, respectively.

In this way, compared with the solutions that use the same model for the entire video, this solution can use multiple small models for different scenes. In addition, these small models are trained using frames corresponding to a specific scene and thus can better learn and adapt to that specific scene. Therefore, this scene-specific model training solution can improve the training quality. In addition, by using these small models, computational resources can be saved while the training speed can be increased.

Moreover, models trained according to the present solution can better learn and adapt to specific scenes. Thus, the quality of video reconstruction can be improved by using the models trained according to the present solution. In addition, by using small models according to the present solution for video reconstruction, it is also possible to save computational resources in the video reconstruction process while improving the efficiency of video reconstruction.

The basic principle and some example implementations of the present disclosure are illustrated below with reference to FIG. 1 to FIG. 8. It should be understood that these example embodiments are given only to enable those skilled in the art to better understand and then implement the embodiments of the present disclosure, and are not intended to limit the scope of the present disclosure in any way.

FIG. 1 illustrates a schematic diagram of environment 100 in which embodiments of the present disclosure can be implemented. In environment 100 of FIG. 1, it is expected that first model 120 and/or second model 130 are trained and applied. First model 120 and second model 130 may be video conversion models, e.g., VSR models. First model 120 and second model 130 are associated with a first scene and a second scene, respectively.

It should be understood that although only two models, first model 120 and second model 130, are illustrated in FIG. 1, it is merely schematic, and training system 110 may utilize N models, where N is an integer greater than or equal to 1. For example, N different models may be trained for N different scenes, respectively. As used herein, the term "scene" may refer to different environments, characters, or actions. The term "scene" may also be used to describe different features in terms of backgrounds, characters, or actions. For example, example scenes may include, but are not limited to: scenes in a particular location (e.g., park, office building, restaurant, etc.), scenes without characters, scenes with a single character or multiple characters, scenes with specific objects, etc.

In general, environment 100 includes training system 110 and optional application system 150. In the example embodiment of FIG. 1 and some example embodiments that will be described below, training system 110 is configured to train first model 120 and second model 130 using reference video 102 to determine parameters of first model 120 and parameters of second model 130.

In some embodiments, training system 110 may be located on a platform such as a video provider or located on a third party providing services to the video provider. In some cases, training system 110 may also be located in a device associated with a video recipient.

In some embodiments, reference video 102 may be a particular video, such as a particular film. It should be understood that although only one reference video 102 is illustrated in FIG. 1, it is merely schematic, and training system 110 may utilize M reference videos, where M is an integer greater than or equal to 1. For example, training system 110 may utilize M movies with similar scenes and of the same series as M reference videos.

In some embodiments, training system 110 may also include other models, components, or operations not shown, so as to divide reference video 102 into different frame groups based on different scenes, for example, a first group of frames 112 and a second group of frames 114 shown in FIG. 1. The first group of frames 112 corresponds to the first scene, such as a scene with the Bund as the background. The second group of frames 114 corresponds to the second scene, such as a scene with the Expo Park as the background. Training system 110 uses the first group of frames 112 and the second group of frames 114 to train first model 120 and second model 130, respectively. The process of training first model 120 and second model 130 will be described in more detail below in conjunction with FIG. 2.

Prior to training, the parameter values of first model 120 and second model 130 may be initialized. After training, the parameter values of first model 120 and second model 130 are updated and determined. After the training is completed, first model 120 and second model 130 have trained parameter values. Based on such parameter values, first model 120 and/or second model 130 may be used to perform video conversion to implement a video processing task. For example, first model 120 and second model 130 may be respectively used to convert frames corresponding to the first scene and the second scene in the video from the first resolution to a second resolution different from the first resolution. In some embodiments, the second resolution may be higher or lower than the first resolution. Herein, the present disclosure is described by taking the example that the second resolution is higher than the first resolution.

Environment 100 optionally includes application system 150. In some embodiments, application system 150 may be located at a video recipient. For example, application system 150 may be located in a client terminal of a user. In some other embodiments, application system 150 may also be located at a remote cloud or an edge end. First model 120 and second model 130 in application system 150 may be trained first model 120 and trained second model 130 from training system 110. Application system 150 receives input video 142. Input video 142 has the first resolution. In some embodiments, input video 142 may be transmitted reference video 102 received at the client terminal of the user. For example, input video 142 may be reference video 102 transmitted by training system 110 to the client terminal of the user.

Application system 150 may also include other models, components, or operations not shown, so as to divide input video 142 into different frame groups based on different scenes, for example, a first group of input frames 152 and a second group of input frames 154 shown in FIG. 1. Application system 150 may be configured to use first model 120 and second model 130 to perform video conversion on the first group of input frames 152 and the second group of input frames 154, respectively. For example, application system 150 may use first model 120 to convert the first group of input frames 152 with the first resolution to a first group of output frames 162 with the second resolution. Similarly, application system 150 may use second model 130 to convert the second group of input frames 154 with the first resolution to a second group of output frames 164 with the second resolution.

Application system 150 may also include other models, components, or operations not shown, so as to generate output video 182 using the generated first group of output frames 162 and second group of output frames 164. In this way, application system 150 may use trained first model 120 and second model 130 to convert input video 142 with the first resolution to output video 182 with the second resolution. It should be understood that, for input video 142 with more scenes, application system 150 may use more trained models to perform video conversion on frame groups of different scenes, respectively, to obtain output video 182.

In FIG. 1, training system 110 and application system 150 may be any system with computing capabilities, such as various computing devices/systems, terminal devices, servers, etc. The terminal device may be any type of mobile terminals, fixed terminals, or portable terminals, including cell phones, desktop computers, laptop computers, notebook computers, netbook computers, tablet computers, media computers, multimedia tablets, or any combination of the foregoing, including accessories and peripherals for these devices or any combination thereof. Servers include, but are not limited to, mainframes, edge computing nodes, computing devices in cloud environments, and the like.

It should be understood that the parts and arrangement in the environment shown in FIG. 1 are only examples, and a computing system suitable for implementing the example embodiments described in the present disclosure may include one or more different parts, other parts, and/or different arrangements. For example, although illustrated as separate, two or more of training system 110 and application system 150 may be integrated in the same system or device. The embodiments of the present disclosure are not limited in this respect.

Figure 2:
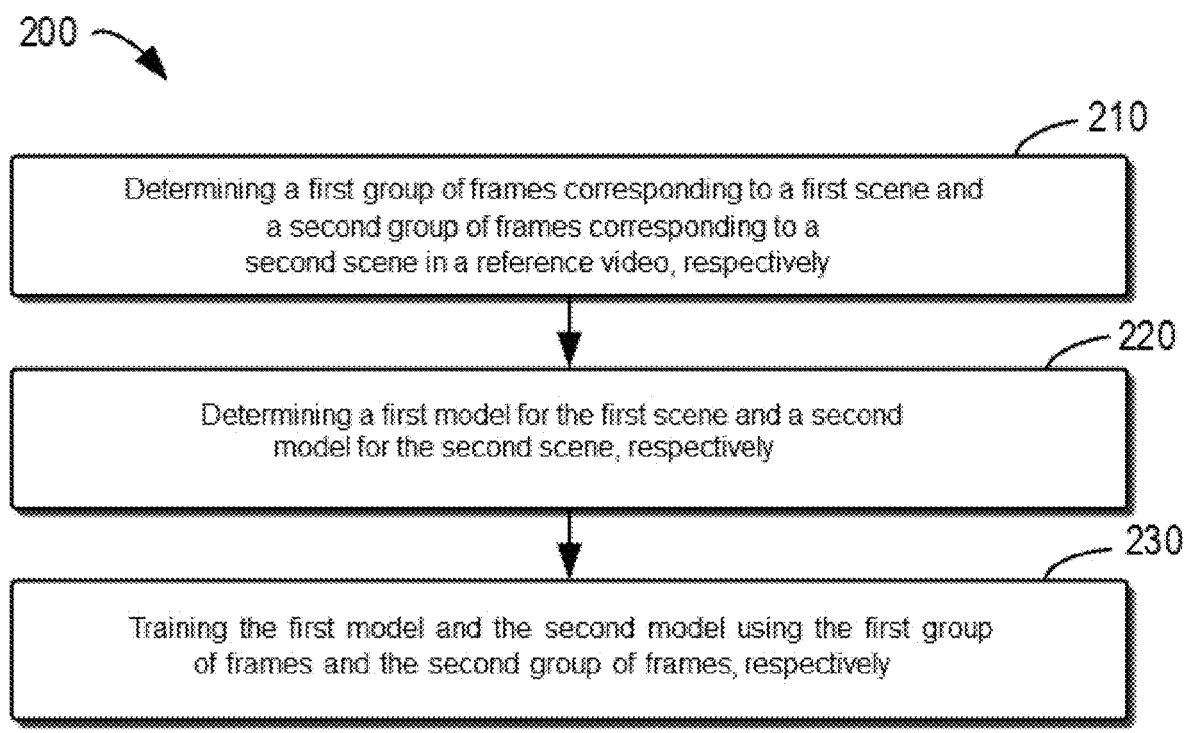
FIG. 2 illustrates a flow chart of a method for training a model according to some embodiments of the present disclosure.

Example embodiments of model training and model application will be respectively described below with continued reference to the accompanying drawings. FIG. 2 illustrates a flow chart of example method 200 for model training according to some embodiments of the present disclosure. Method 200 may be performed, for example, by training system 110. It should be understood that method 200 may also include additional actions that are not shown. Method 200 is described in detail below with reference to FIG. 1.

At block 210, training system 110 determines a first group of frames 112 corresponding to a first scene and a second group of frames 114 corresponding to a second scene in reference video 102, respectively. The first group of frames 112 and the second group of frames 114 each have a first resolution. The second scene is different from the first scene. For example, in reference video 102 including a first scene with the Bund as the environment and a second scene with the Expo Park as the environment, at least one frame corresponding to the Bund (i.e., the first scene) may be determined as the first group of frames 112. Similarly, at least one frame corresponding to the Expo Park (i.e., the second scene) may be determined as the second group of frames 114.

In some embodiments, training system 110 may determine at least one first scene switching position corresponding to the first scene and at least one second scene switching position corresponding to the second scene in reference video 102 according to one or more pixels of each frame in reference video 102. Training system 110 may then determine the first group of frames 112 corresponding to the first scene and the second group of frames 114 corresponding to the second scene in reference video 102 based on the at least one first scene switching position and the at least one second scene switching position, respectively.

Figure 3:
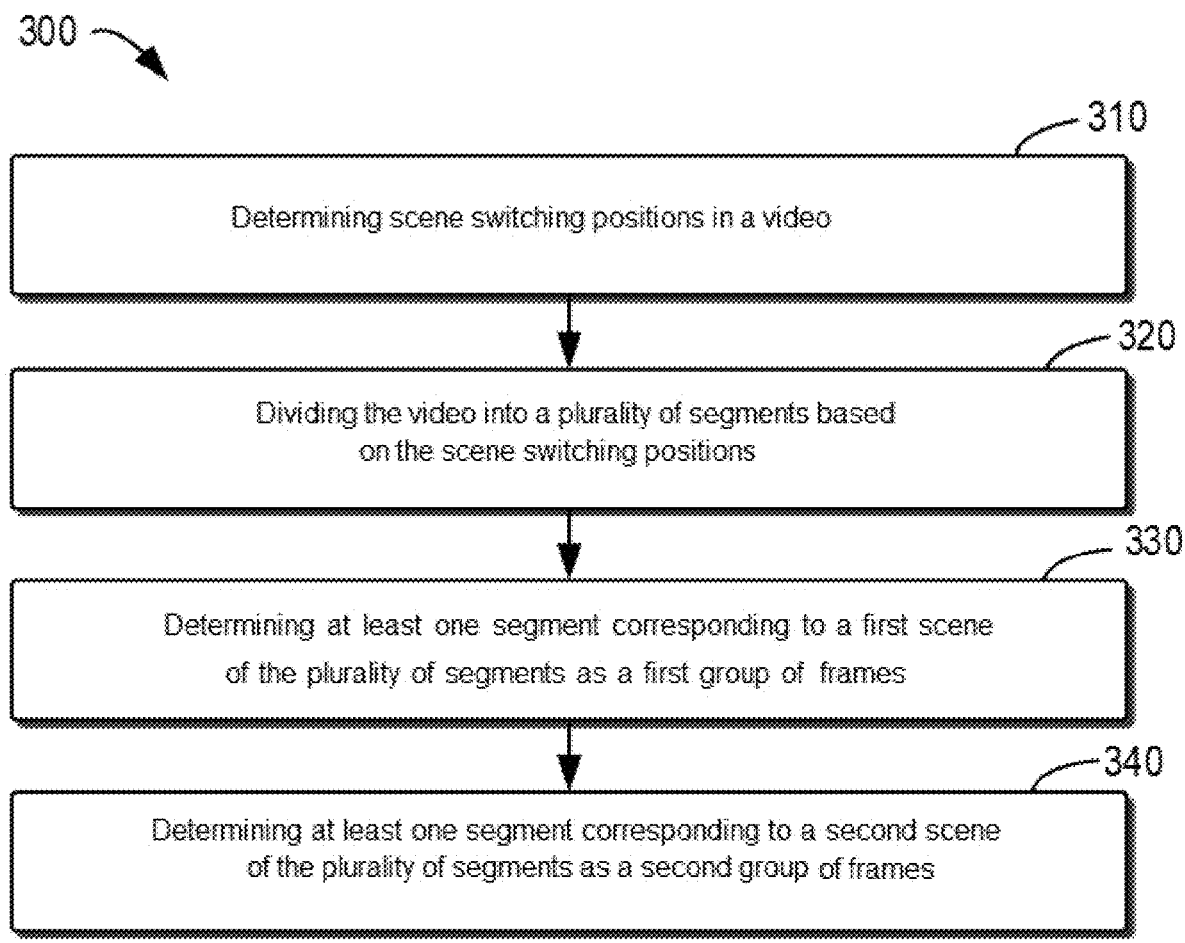
FIG. 3 illustrates a flow chart of a method for grouping frames in a video based on a scene according to some embodiments of the present disclosure.

FIG. 3 illustrates a flow chart of method 300 for grouping frames in a video based on a scene according to some embodiments of the present disclosure. Method 300 may be performed, for example, by training system 110 to group reference video 102. In some embodiments, method 300 may also be performed by application system 150 to group input video 142. It should be understood that method 300 may also include additional actions that are not shown. Method 300 is described in detail below with reference to FIG. 1.

At block 310, scene switching positions in a video are determined. For example, training system 110 may determine at least one first scene switching position corresponding to the first scene and/or at least one second scene switching position corresponding to the second scene in reference video 102 according to one or more pixels of each frame in reference video 102. In some embodiments, the at least one first scene switching position and/or the at least one second scene switching position may be determined by detecting a similarity between adjacent frames in reference video 102. For example, if the similarity between two adjacent frames is below a threshold, it is determined that scene switching is detected between the above two adjacent frames in that reference video.

Figure 4:
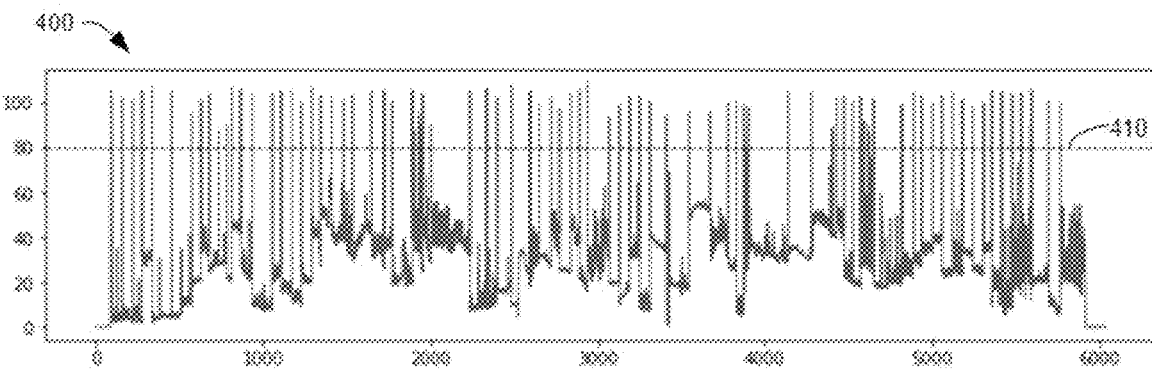
FIG. 4 illustrates a schematic diagram of the scrolling difference between adjacent frames in a video according to some embodiments of the present disclosure.

In some embodiments, other suitable approaches may be used to detect scene switching and determine scene switching positions. For example, scene switching positions may be determined based on the scrolling difference between adjacent frames. FIG. 4 illustrates a schematic diagram of scrolling difference 400 between adjacent frames in a video according to some embodiments of the present disclosure. As shown in FIG. 4, in some embodiments, difference threshold 410 may be pre-set. If the difference between two adjacent frames exceeds difference threshold 410 (i.e., located above difference threshold 410 in FIG. 4), it is determined that scene switching is detected at a corresponding position in reference video 102. This position may be determined as a scene switching position.

In some embodiments, if it is determined that at that scene switching position, the frame is switched to the first scene, then the scene switching position is determined as the first scene switching position. Similarly, if it is determined that at that scene switching position, the frame is switched to the second scene, then the scene switching position is determined as the second scene switching position.

Referring back to FIG. 3, at block 320, the video is divided into a plurality of segments based on the scene switching positions. For example, training system 110 may divide reference video 102 into a plurality of segments based on the at least one first scene switching position and the at least one second scene switching position. Additionally or alternatively, in some embodiments, a maximum segment duration of the video segments may be determined. If the duration of a segment divided based on the scene switching positions exceeds that maximum segment duration, that segment may be further divided into two or more segments that do not exceed the maximum segment duration.

At block 330, at least one segment corresponding to a first scene of the plurality of segments is determined as a first group of frames 112. At block 340, at least one segment corresponding to a second scene of the plurality of segments is determined as a second group of frames 114. For example, training system 110 may add, according to similarities between each segment and scenes, the segment to a frame group corresponding to the scene that is similar to it.

In some embodiments, based on the pixels of frames in each segment, training system 110 may determine similarities between that segment and different scenes. The scene with a high similarity with one particular segment is determined as the scene corresponding to that segment. If training system 110 determines that one particular segment corresponds to the first scene, the frames in that segment are added to the first group of frames 112. Similarly, if training system 110 determines that one particular segment corresponds to the second scene, the frames in that segment are added to the second group of frames 114. For example, at least one segment corresponding to a scene in which the same characters are talking in a living room may be combined to generate, for example, the first group of frames 112.

In some embodiments, it is also possible to determine the maximum duration or the maximum number of frames for a frame group. If the duration of the first group of frames 112 obtained according to the above method exceeds the maximum duration, or if the number of frames of the first group of frames 112 exceeds the maximum number of frames, the first group of frames 112 may be further divided into two or more frame groups of which the duration or the number of frames does not exceed the maximum duration or the maximum number of frames.

It should be understood that the above embodiment in which frames in a video are grouped according to the scene is only an example and is not intended to limit the present disclosure. In some embodiments, other automatic or semi-automatic methods may also be used to group frames in a video.

It should be understood that although the description is given in conjunction with FIG. 1 and taking two frame groups for two scenes as an example, it is merely an example and is not intended to limit the scope of the present disclosure. In some embodiments, the video may be divided into two or more frame groups for two or more scenes.

Figure 5:
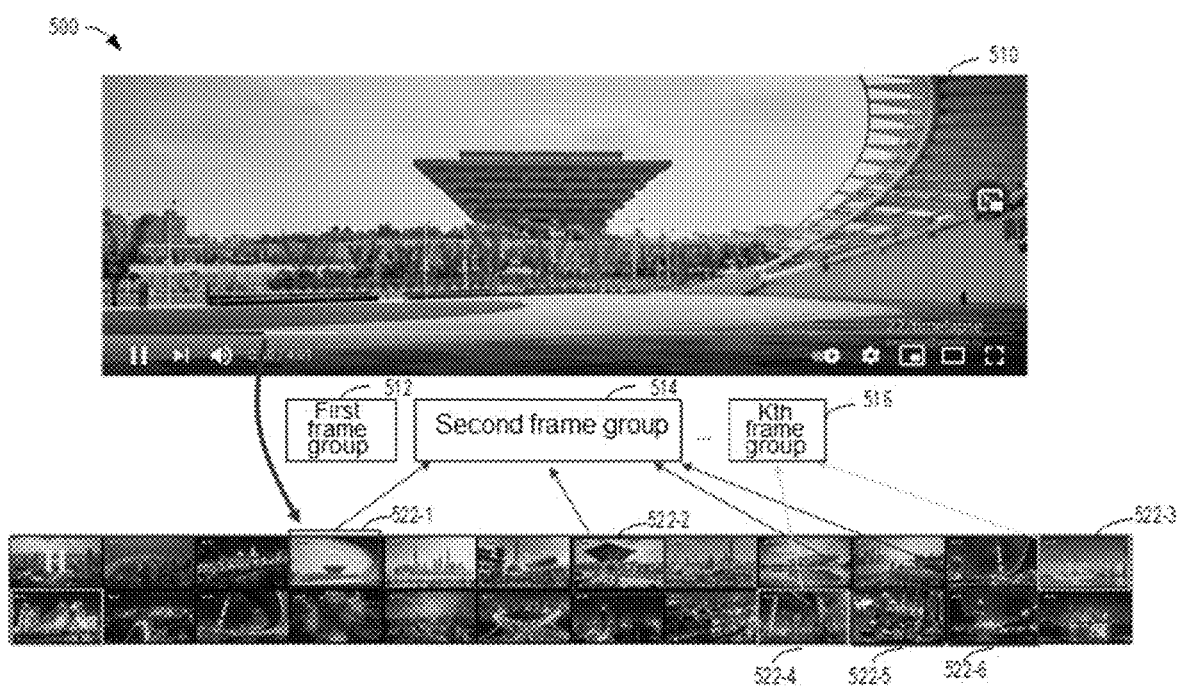
FIG. 5 illustrates a schematic diagram of an example result of grouping frames in a video based on a scene according to some embodiments of the present disclosure.

FIG. 5 illustrates a schematic diagram of example result 500 of grouping frames in a video based on a scene according to some embodiments of the present disclosure. Video 510 in FIG. 5 may be an example of reference video 102 or input video 142. In the example of FIG. 5, video 510 is divided into a first frame group 512, a second frame group 514, . . . , and a Kth frame group 516, where K is an integer greater than or equal to 2. Taking the second frame group 514 as an example, the second frame group 514 may correspond to scenes with the Expo Park as the background. For example, frames 522-1, 522-2, 522-3, 522-4, 522-5, and 522-6 in FIG. 5 all correspond to scenes with the Expo Park as the background and thus may be added to the second frame group 514. Similarly, frames corresponding to corresponding scenes may be added to the first frame group 512, . . . , and the Kth frame group 516, respectively.

It should be understood that the above embodiment in which frames in a video are grouped according to scenes is only an example and is not intended to limit the present disclosure. In some embodiments, other automatic or semi-automatic methods may also be used to group frames in a video.

By combining video segments corresponding to the same scene into one frame group, the number of visual elements of each frame group can be made relatively small. For example, for frames corresponding to the same frame group, the background images of the frames may remain almost unchanged. Using such frame group corresponding to a scene to train a model for that scene can enable the model to learn visual patterns easily and efficiently, thus greatly improving the training efficiency. In addition, different segments for the same scene may use the same model, which also reduces the number of models needed.

Referring back to FIG. 2, at block 220, training system 110 determines a first model for the first scene and a second model for the second scene, respectively. First model 120 and second model 130 are respectively used to convert the frames corresponding to the first scene and the second scene from the first resolution to a second resolution. For example, VSR models of the same dimension (also referred to as size) or with the same number of parameters may be determined for the first scene and the second scene, respectively.

Additionally or alternatively, first model 120 and/or second model 130 may be determined based on an efficiency/quality parameter. In some embodiments, training system 110 may determine a first efficiency/quality parameter for the first scene. The first efficiency/quality parameter indicates a conversion efficiency and/or a conversion quality that first model 120 needs to achieve when performing a conversion from the first resolution to the second resolution for frames corresponding to the first scene. That is, the first efficiency/quality parameter indicates the conversion efficiency and/or the conversion quality that first model 120 needs to achieve when converting the first group of frames 112 from the first resolution to the second resolution.

In some embodiments, the efficiency/quality parameter (e.g., the first efficiency/quality parameter) may be pre-set by a video provider (e.g., YouTube). Additionally or alternatively, the efficiency/quality parameter (e.g., the first efficiency/quality parameter) may be set by a video recipient (e.g., a user who is viewing on YouTube). The video recipient may transmit the set efficiency/quality parameter (e.g., the first efficiency/quality parameter) to training system 110 for subsequent training processes.

In some embodiments, training system 110 may determine the dimension of first model 120 based on the first efficiency/quality parameter. Training system 110 may then determine first model 120 based on that dimension. For example, based on that dimension, the number of parameters of first model 120 is determined.

In some embodiments, if training system 110 determines that the first efficiency/quality parameter indicates that the conversion efficiency that first model 120 needs to achieve when performing the conversion exceeds an efficiency threshold, training system 110 determines the dimension of first model 120 as a first dimension that is less than a first dimension threshold. By using small first model 120, a high frame rate can be obtained in subsequent application in application system 150. In scenarios where application system 150 uses first model 120 for video reconstruction, the efficiency of subsequent video reconstruction can be improved by using small first model 120.

Additionally or alternatively, the efficiency/quality parameter may also be used in the process of grouping frames in a video. For example, if training system 110 determines that the first efficiency/quality parameter indicates that the conversion efficiency that first model 120 needs to achieve when performing the conversion exceeds the efficiency threshold, training system 110 may perform a finer division on reference video 102. For example, difference threshold 410 in FIG. 4 may be determined as a small value. In this way, it can be ensured that a small model is trained using more finely divided frame groups. Thus, even using a small model, it is still possible to ensure that the model can better learn a particular fine scene. In this way, it can be ensured that, in subsequent video conversions such as the reconstruction process, a high quality can be achieved while a high conversion efficiency is ensured.

In some embodiments, if training system 110 determines that the first efficiency/quality parameter indicates that the conversion quality that first model 120 needs to achieve when performing the conversion exceeds a quality threshold, training system 110 determines the dimension of first model 120 as a second dimension that is greater than a second dimension threshold. The first dimension threshold and the second dimension threshold as previously described may be pre-set by training system 110. The first dimension threshold and the second dimension threshold may be the same or different. By using large-sized first model 120, it can be ensured that first model 120 can better learn the first group of frames 112 for the first scene. In this way, it is possible to improve the quality of subsequent video conversion, such as the video reconstruction process, performed by application system 150.

It should be understood that although the process of determining first model 120 based on the first efficiency/quality parameter is described by taking the first efficiency/quality parameter for first model 120 as an example, for other models in training system 110, such as second model 130, a similar process may be used for model determination based on corresponding efficiency/quality parameters.

In some embodiments, the efficiency/quality parameter may be determined as a minimum service level agreement (SLA) for both efficiency (e.g., frames per second (FPS)) and quality. The efficiency/quality parameter may also be determined as the minimum efficiency and/or minimum quality required. Additionally or alternatively, the efficiency/quality parameter may be implemented as a binary switch or other form of values mapped to the appropriate efficiency and/or quality.

By determining the model based on the efficiency/quality parameter, it can be ensured that the trained model can obtain a high efficiency of video conversion (e.g., reconstruction) while improving the quality of video conversion (e.g., reconstruction).

Referring again to FIG. 2, at block 230, training system 110 uses the first group of frames 112 and the second group of frames 114 to train first model 120 and second model 130, respectively. For example, training system 110 may use the first group of frames 112 as training samples to train first model 120 to determine parameters (e.g., conversion parameters) of first model 120. Similarly, training system 110 may use the second group of frames 114 as training samples to train second model 130 to determine parameters (e.g., conversion parameters) of second model 130.

It should be understood that any appropriate model training method may be used to train first model 120 and second model 130 using the first group of frames 112 and the second group of frames 114, respectively. The example model training process is described below by taking the training of first model 120 using the first group of frames 112 as an example.

In some embodiments, training system 110 may generate, based on first model 120 and according to the first group of frames 112, a third group of frames having a second resolution. Training system 110 may also acquire a second reference video having the second resolution and with the same video content as reference video 102. Training system 110 may determine a first group of reference frames corresponding to the first group of frames 112 from the second reference video. Training system 110 may train first model 120 based on differences between frames in the third group of frames and corresponding frames in the first group of reference frames. For example, the parameters of first model 120 are determined by minimizing the total difference between the frames in the third group of frames and the corresponding frames in the first group of reference frames. Additionally or additionally, if the above total difference is reduced to be below a predetermined threshold, the training may be completed, resulting in trained first model 120.

Similarly, the same training approach may be used to train second model 130 based on the second group of frames 114. It should be understood that embodiments of the present disclosure is not limited by the specific form of the model, the specific value of the resolution, or the specific method of model training.

By determining and training different models for different scenes, it is possible for a model to learn only a small number of visual patterns. In this way, the model can better learn the features of the scene and thus improve the quality of subsequent video conversion, such as video reconstruction. In addition, by using multiple small models to replace one large model, the quality of video reconstruction of different scenes can be improved. In addition, small models require fewer computational resources and are faster in inference, which in turn can further improve the efficiency of video reconstruction.

The training of first model 120 and second model 130 has been discussed above in conjunction with FIGS. 2 to 5. In some embodiments, trained first model 120 and second model 130 may be provided to application system 150 to perform video processing, such as video conversion or video reconstruction, on input video 142.

Figure 6:
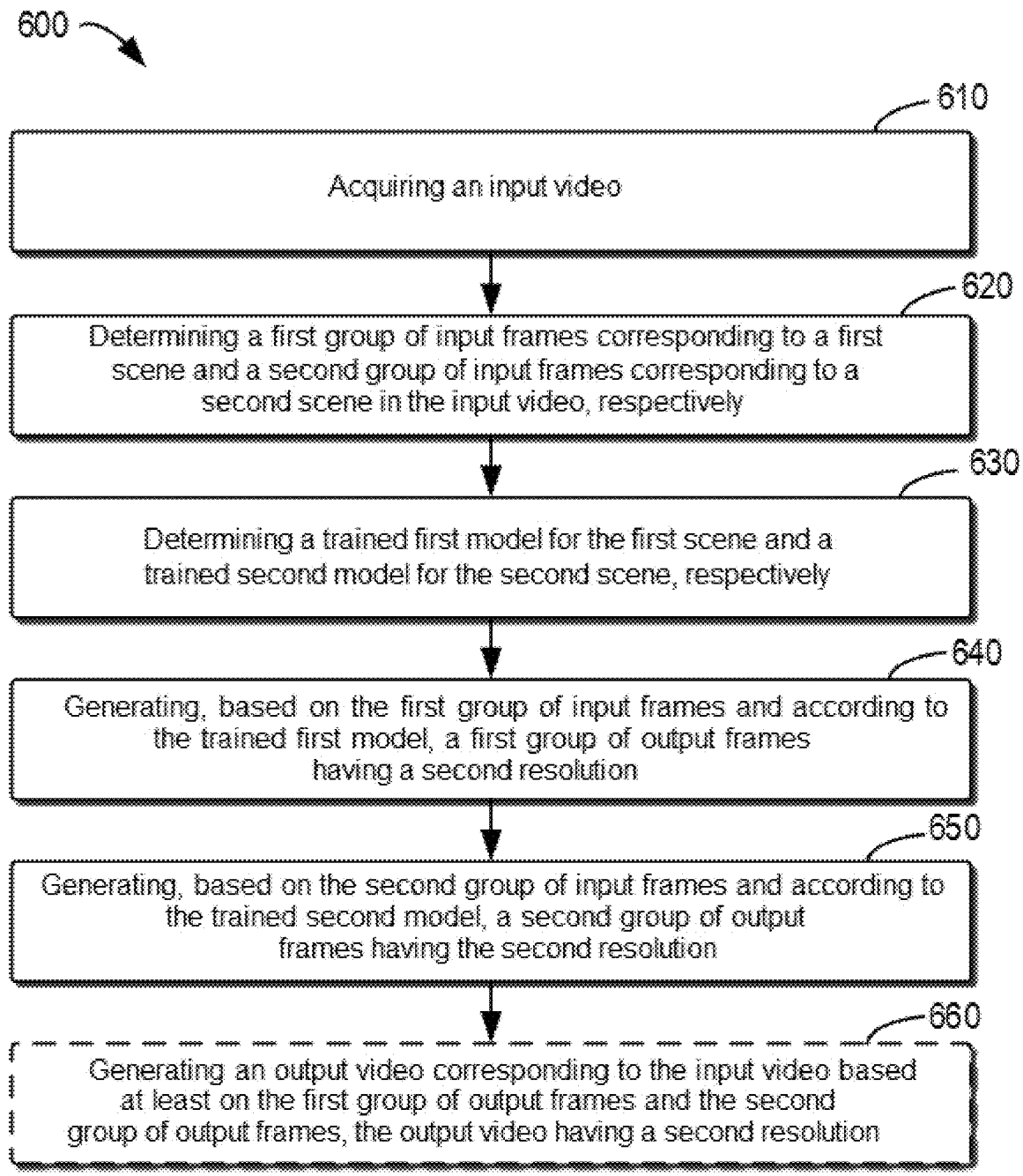
FIG. 6 illustrates a flow chart of a method for video processing according to some embodiments of the present disclosure.

FIG. 6 illustrates a flow chart of example method 600 for video processing according to some embodiments of the present disclosure. Method 600 may be performed, for example, by application system 150. It should be understood that method 600 may also include additional actions that are not shown. Method 600 is described in detail below with reference to FIG. 1.

At block 610, application system 150 acquires input video 142. For example, application system 150 may acquire reference video 102 from training system 110 as input video 142. Alternatively, application system 150 may also acquire a video associated with reference video 102 from the video provider as input video 142.

For example, the video recipient (e.g., a user who is watching a movie on YouTube) may select the video to be acquired (e.g., a movie the user wants to watch). Training system 110 at the video provider (e.g., YouTube) may provide via the Internet a selected version (also referred to as an instance) of that video and having the first resolution (lower resolution) to application system 150 at the video recipient as input video 142. In addition, the video recipient may also select a start time and/or an end time for input video 142.

At block 620, application system 150 determines a first group of input frames 152 corresponding to the first scene and a second group of input frames 154 corresponding to the second scene in input video 142, respectively. The first group of input frames 152 and the second group of input frames 154 each have the first resolution. The second scene is different from the first scene.

For example, application system 150 may use method 300 described with reference to FIG. 3 to determine the first group of input frames 152 and the second group of input frames 154, which will not be described in detail herein. It should be understood that application system 150 may also employ other appropriate approaches to determine the first group of input frames 152 and the second group of input frames 154 based on the scene. The embodiments of the present disclosure are not limited in this respect.

It should be understood that, alternatively, in some embodiments, application system 150 may receive, directly from the video provider or training system 110, the first group of input frames 152 and the second group of input frames 154 of input video 142 grouped by scenes. In this case, application system 150 may directly process the received first group of input frames 152 and second group of input frames 154 using first model 120 and second model 130, respectively, without performing the frame grouping process.

At block 630, application system 150 determines a trained first model 120 for the first scene and a trained second model 130 for the second scene, respectively. First model 120 and second model 130 are trained according to method 200. The process of determining first model 120 by application system 150 will be described below using first model 120 as an example.

In some embodiments, training system 110 may transmit one trained first model 120 to application system 150. Application system 150 may determine this first model 120 to be first model 120 to be used.

Additionally or alternatively, training system 110 may transmit a plurality of trained first models 120 to application system 150. For example, training system 110 may transmit trained first models 120 having different dimensions to application system 150. As previously described, the dimension of first model 120 may be associated with the first efficiency/quality parameter.

In this case, application system 150 may determine the received plurality of trained first models 120 to be at least one trained candidate model for the first scene. Application system 150 may determine the dimension of the trained first model 120 based on the first efficiency/quality parameter. The first efficiency/quality parameter indicates the conversion efficiency and/or conversion quality that trained first model 120 needs to achieve when performing a conversion from the first group of input frames 152 to a first group of output frames 162. Application system 150 may determine the dimension of trained first model 120 based on the first efficiency/quality parameter in the same or similar manner as the aforementioned manner in which the training system determines the dimension of the model based on the efficiency/quality parameter. This process will not be described in detail herein.

In some embodiments, application system 150 may select a trained first model 120 having that dimension from among the at least one trained candidate model based on that dimension. Similarly, application system 150 may use the same or similar approach to select a trained second model 130 from one or more candidate second models.

At block 640, application system 150 generates, based on the first group of input frames 152, the first group of output frames 162 having the second resolution according to the trained first model 120. At block 650, application system 150 generates, based on the second group of input frames 154, a second group of output frames 164 having the second resolution according to the trained second model 130.

In some embodiments, at block 660, application system 150 may optionally generate output video 182 corresponding to input video 142 based at least on the first group of output frames 162 and the second group of output frames 164. Output video 182 has the second resolution. For example, in the example described above of dividing frame groups based on only two different scenes, the frames in the first group of output frames 162 and the second group of output frames 164 may be sorted in chronological order to generate output video 182. For example, application system 150 may convert or reconstruct input video 142 having a low resolution received from the video provider to output video 182 having a high resolution.

By using the first model and/or the second model trained according to the method of the present disclosure, a high quality of video reconstruction can be obtained even for a complex video or long video. In addition, by using different models for different scenes, it is possible to use models with even smaller dimensions. In this way, it is possible to reduce the computational resources required for reconstruction while ensuring a high quality of the output video. In this way, the efficiency of video reconstruction can be improved.

Furthermore, by selecting first model 120 and/or second model 130 based on the efficiency/quality parameter, it is possible to ensure that output video 182 obtained by means of video conversion or video reconstruction has the required quality while the video conversion efficiency is improved (i.e., without affecting the FPS).

Figure 7:
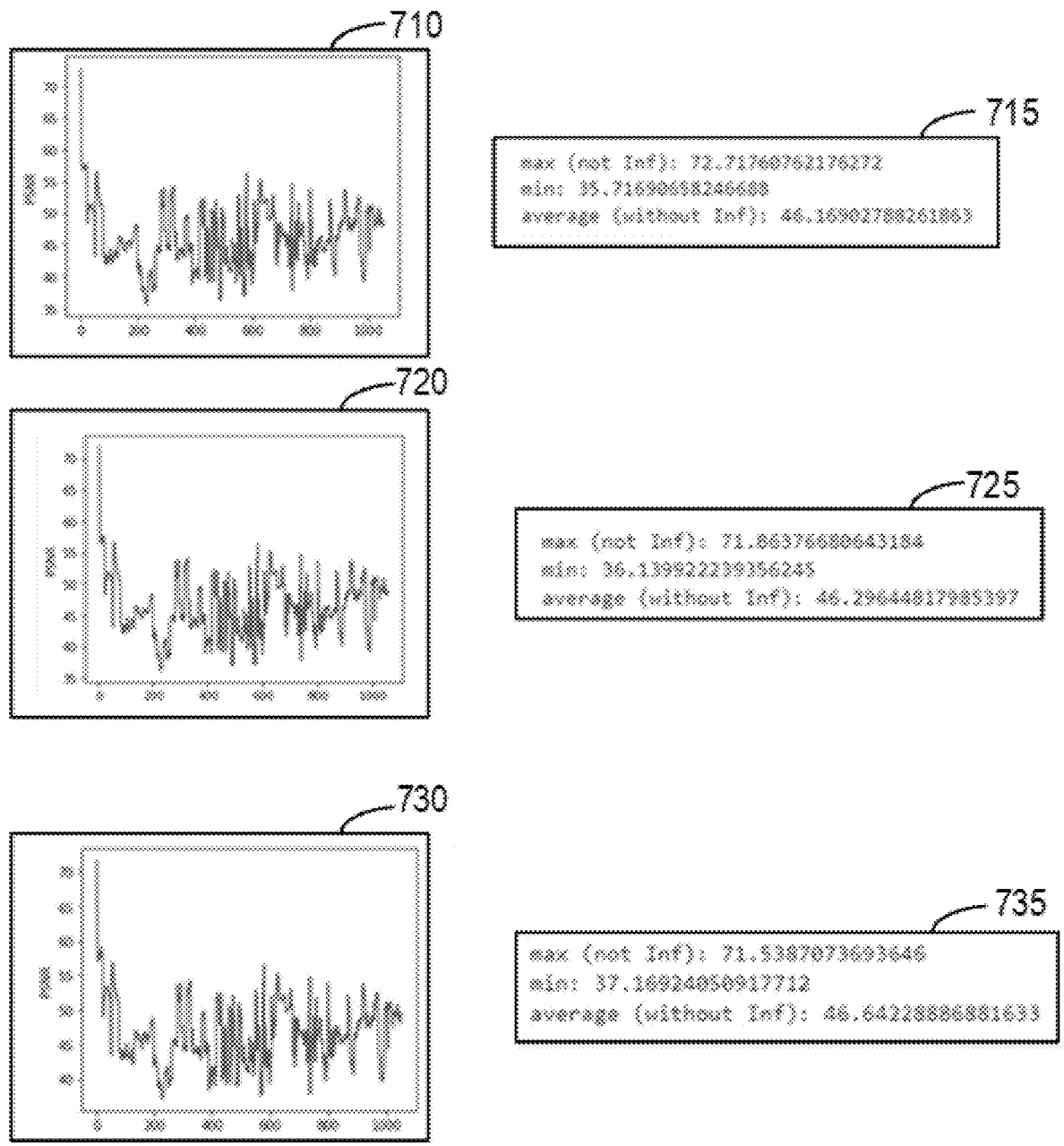
FIG. 7 illustrates a schematic diagram of the quality of video reconstruction according to some embodiments of the present disclosure.

FIG. 7 illustrates a schematic diagram of the quality of video reconstruction according to some embodiments of the present disclosure. In FIG. 7, curve 710, curve 720, and curve 730 illustrate the peak signal-to-noise ratios (PSNRs) obtained when performing video reconstruction using a plurality of models corresponding to a scene that are trained on full clips, ½ clips, and ¼ clips of a video, respectively. Block 715, block 725, and block 735 show the maximum, minimum, and average values of PSNR corresponding to curve 710, curve 720, and curve 730, respectively.

As can be seen from FIG. 7, the model for the scene that is trained using the method of the present disclosure can obtain a very high visual perceptual quality (not shown) as well as quantitative quality indicated by the PSNR when performing video conversion or video reconstruction. Thus, the use of the model training method and video processing method of the present disclosure can improve the quality of video conversion or video reconstruction.

The model training method and video processing method of the present disclosure can be applied to a wide range of applications, such as real-time, high frame-rate, and high-quality video streaming, or for remote gaming, remote monitoring, etc. In addition, the solutions of the present disclosure may also be applied to various video data reduction applications, for example, video storage, streaming, or video content delivery. For example, the solution of the present disclosure may be used for video content delivery from a cloud to a user's client terminal, or from a cloud to an edge end and from the edge end to a user's client terminal.

Figure 8:
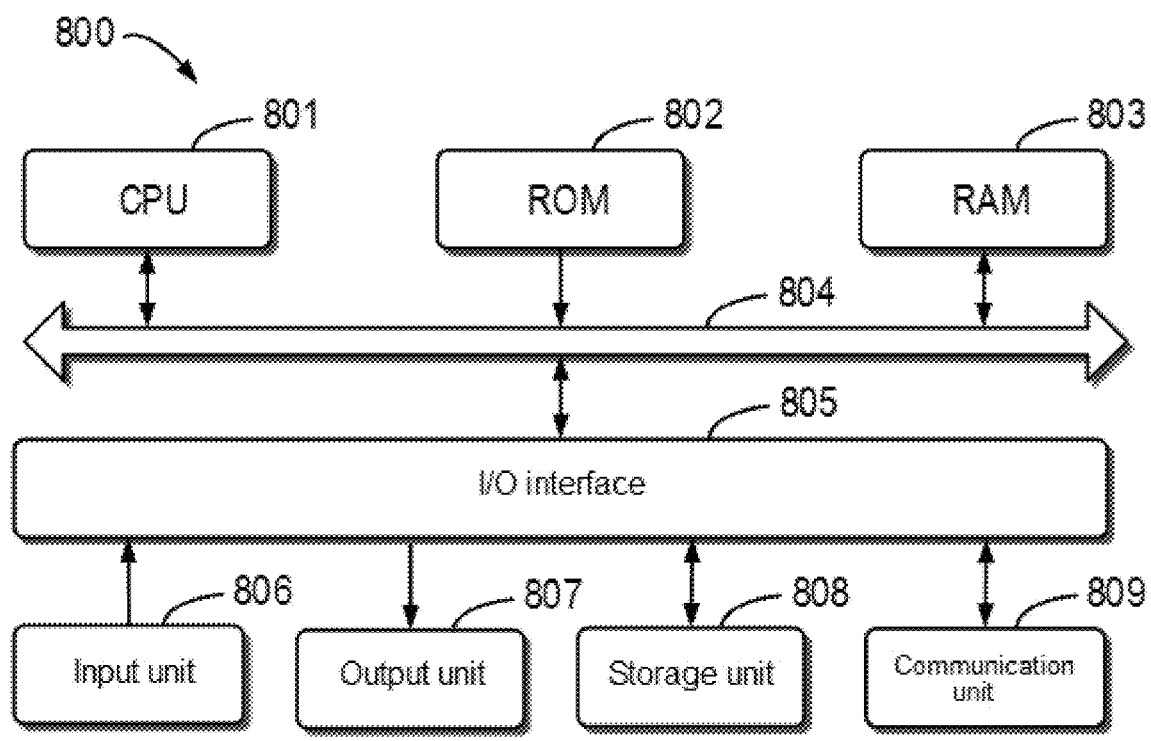
FIG. 8 illustrates a schematic block diagram of a device that may be used to implement embodiments of the present disclosure.

FIG. 8 illustrates a schematic block diagram of device 800 that may be used to implement embodiments of the present disclosure. Device 800 may be a device or apparatus as described in embodiments of the present disclosure. As shown in FIG. 8, device 800 includes central processing unit (CPU) 801, which may execute various appropriate actions and processing in accordance with computer program instructions stored in read-only memory (ROM) 802 or computer program instructions loaded onto random access memory (RAM) 803 from storage unit 808. Various programs and data required for the operation of device 800 may also be stored in RAM 803. CPU 801, ROM 802, and RAM 803 are connected to each other through bus 804. Input/output (I/O) interface 805 is also connected to bus 804. Although not shown in FIG. 8, device 800 may also include a co-processor.

A plurality of parts in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices via a computer network, such as the Internet, and/or various telecommunication networks.

The various methods or processes described above may be performed by CPU 801. For example, in some embodiments, the method may be embodied as a computer software program that is tangibly included in a machine-readable medium, such as storage unit 808. In some embodiments, part or all of the computer program may be loaded and/or installed onto device 800 via ROM 802 and/or communication unit 809. When the computer program is loaded into RAM 803 and executed by CPU 801, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages, as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in the reverse order, depending on the functions involved. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Various embodiments of the present disclosure have been described above. The foregoing description is illustrative rather than exhaustive, and is not limited to the disclosed various embodiments. Numerous modifications and alterations will be apparent to those of ordinary skill in the art without departing from the scope and spirit of the illustrated embodiments. The selection of terms as used herein is intended to best explain the principles and practical applications of the various embodiments or the technical improvements to technologies on the market, so as to enable persons of ordinary skill in the art to understand the embodiments disclosed herein.

What is claimed is:

1. A computer-implemented method, comprising:
determining a first group of frames corresponding to a first scene and a second group of frames corresponding to a second scene in a reference video, respectively, the first group of frames and the second group of frames each having a first resolution, and the second scene being different from the first scene;
determining a first model for the first scene and a second model for the second scene, respectively, the first model and the second model being respectively used to convert frames corresponding to the first scene and the second scene from the first resolution to a second resolution different from the first resolution; and
training the first model and the second model using the first group of frames and the second group of frames, respectively;
wherein the method further comprises determining a first efficiency/quality parameter which indicates at least one of a conversion efficiency and a conversion quality that the first model needs to achieve when performing the conversion from the first resolution to the second resolution on frames corresponding to the first scene; and
wherein determining the first model comprises:
determining a dimension of the first model based on the first efficiency/quality parameter; and
determining the first model based on the dimension.

2. The method according to claim 1, wherein determining the first group of frames and the second group of frames comprises:
determining at least one first scene switching position corresponding to the first scene and at least one second scene switching position corresponding to the second scene in the reference video according to one or more pixels of each frame in the reference video; and
determining the first group of frames corresponding to the first scene and the second group of frames corresponding to the second scene in the reference video based on the at least one first scene switching position and the at least one second scene switching position, respectively.

3. The method according to claim 2, wherein determining the first group of frames and the second group of frames, respectively, comprises:
dividing the reference video into a plurality of segments based on the at least one first scene switching position and the at least one second scene switching position;
determining at least one segment corresponding to the first scene of the plurality of segments as the first group of frames; and
determining at least one segment corresponding to the second scene of the plurality of segments as the second group of frames.

4. The method according to claim 1, wherein determining the dimension comprises:
if the first efficiency/quality parameter is determined to indicate that the conversion efficiency that the first model needs to achieve when performing the conversion exceeds an efficiency threshold, determining the dimension of the first model as a first dimension, the first dimension being less than a first dimension threshold; and/or
if the first efficiency/quality parameter is determined to indicate that the conversion quality that the first model needs to achieve when performing the conversion exceeds a quality threshold, determining the dimension of the first model as a second dimension, the second dimension being greater than a second dimension threshold.

5. The method according to claim 1, further comprising:
acquiring an input video;
determining a first group of input frames corresponding to a first scene and a second group of input frames corresponding to a second scene in the input video, respectively, the first group of input frames and the second group of input frames each having a first resolution, and the second scene being different from the first scene;
determining a trained first model for the first scene and a trained second model for the second scene, respectively;
generating, based on the first group of input frames and according to the trained first model, a first group of output frames having a second resolution, the second resolution being different from the first resolution; and
generating, based on the second group of input frames and according to the trained second model, a second group of output frames having the second resolution.

6. The method according to claim 5, further comprising:
generating an output video corresponding to the input video based at least on the first group of output frames and the second group of output frames, the output video having the second resolution.

7. The method according to claim 5, wherein determining the trained first model comprises:
determining at least one trained candidate model for the first scene;
determining a dimension of the trained first model based on a first efficiency/quality parameter, the first efficiency/quality parameter indicating at least one of a conversion efficiency and a conversion quality that the trained first model needs to achieve when performing a conversion from the first group of input frames to the first group of output frames; and selecting the trained first model from the at least one trained candidate model based on the dimension.

8. An electronic device, comprising:

at least one processor; and at least one memory storing computer program instructions, wherein the at least one memory and the computer program instructions are configured to cause, together with the at least one processor, the electronic device to perform actions comprising:

determining a first group of frames corresponding to a first scene and a second group of frames corresponding to a second scene in a reference video, respectively, the first group of frames and the second group of frames each having a first resolution, and the second scene being different from the first scene;

determining a first model for the first scene and a second model for the second scene, respectively, the first model and the second model being used to convert frames corresponding to the first scene and the second scene from the first resolution to a second resolution different from the first resolution, respectively; and training the first model and the second model using the first group of frames and the second group of frames, respectively;

wherein the actions further comprise determining a first efficiency/quality parameter which indicates at least one of a conversion efficiency and a conversion quality that the first model needs to achieve when performing the conversion from the first resolution to the second resolution on frames corresponding to the first scene; and wherein determining the first model comprises:

determining a dimension of the first model based on the first efficiency/quality parameter; and determining the first model based on the dimension.

9. The electronic device according to claim 8, wherein determining the first group of frames and the second group of frames comprises:

determining at least one first scene switching position corresponding to the first scene and at least one second scene switching position corresponding to the second scene in the reference video according to one or more pixels of each frame in the reference video; and determining the first group of frames corresponding to the first scene and the second group of frames corresponding to the second scene in the reference video based on the at least one first scene switching position and the at least one second scene switching position, respectively.

10. The electronic device according to claim 9, wherein determining the first group of frames and the second group of frames, respectively, comprises:

dividing the reference video into a plurality of segments based on the at least one first scene switching position and the at least one second scene switching position;

determining at least one segment corresponding to the first scene of the plurality of segments as the first group of frames; and determining at least one segment corresponding to the second scene of the plurality of segments as the second group of frames.

11. The electronic device according to claim 8, wherein determining the dimension comprises:

if the first efficiency/quality parameter is determined to indicate that the conversion efficiency that the first model needs to achieve when performing the conversion exceeds an efficiency threshold, determining the dimension of the first model as a first dimension, the first dimension being less than a first dimension threshold; and/or if the first efficiency/quality parameter is determined to indicate that the conversion quality that the first model needs to achieve when performing the conversion exceeds a quality threshold, determining the dimension of the first model as a second dimension, the second dimension being greater than a second dimension threshold.

12. The electronic device according to claim 8, wherein the at least one memory and the computer program instructions are further configured to cause, together with the at least one processor, the electronic device to perform additional actions comprising:

acquiring an input video;

determining a first group of input frames corresponding to a first scene and a second group of input frames corresponding to a second scene in the input video, respectively, the first group of input frames and the second group of input frames each having a first resolution, and the second scene being different from the first scene;

determining a trained first model for the first scene and a trained second model for the second scene, respectively;

generating, based on the first group of input frames and according to the trained first model, a first group of output frames having a second resolution, the second resolution being different from the first resolution; and generating, based on the second group of input frames and according to the trained second model, a second group of output frames having the second resolution.

13. The electronic device according to claim 12, wherein the actions further comprise:

generating an output video corresponding to the input video based at least on the first group of output frames and the second group of output frames, the output video having the second resolution.

14. The electronic device according to claim 12, wherein determining the trained first model comprises:

determining at least one trained candidate model for the first scene;

determining a dimension of the trained first model based on a first efficiency/quality parameter, the first efficiency/quality parameter indicating at least one of a conversion efficiency and a conversion quality that the trained first model needs to achieve when performing a conversion from the first group of input frames to the first group of output frames; and selecting the trained first model from the at least one trained candidate model based on the dimension.

15. A computer program product tangibly stored in a non-transitory computer-readable medium and comprising machine-executable instructions, wherein the machine-executable instructions, when executed by a machine, cause the machine to execute a method comprising:

determining a first group of frames corresponding to a first scene and a second group of frames corresponding to a second scene in a reference video, respectively, the first group of frames and the second group of frames each having a first resolution, and the second scene being different from the first scene;

determining a first model for the first scene and a second model for the second scene, respectively, the first model and the second model being respectively used to convert frames corresponding to the first scene and the second scene from the first resolution to a second resolution different from the first resolution; and training the first model and the second model using the first group of frames and the second group of frames, respectively;

wherein the method further comprises determining a first efficiency/quality parameter which indicates at least one of a conversion efficiency and a conversion quality that the first model needs to achieve when performing the conversion from the first resolution to the second resolution on frames corresponding to the first scene; and wherein determining the first model comprises:

determining a dimension of the first model based on the first efficiency/quality parameter; and determining the first model based on the dimension.

16. The computer program product according to claim 15, wherein determining the first group of frames and the second group of frames comprises:

determining at least one first scene switching position corresponding to the first scene and at least one second scene switching position corresponding to the second scene in the reference video according to one or more pixels of each frame in the reference video; and determining the first group of frames corresponding to the first scene and the second group of frames corresponding to the second scene in the reference video based on the at least one first scene switching position and the at least one second scene switching position, respectively.

17. The computer program product according to claim 16, wherein determining the first group of frames and the second group of frames, respectively, comprises:

dividing the reference video into a plurality of segments based on the at least one first scene switching position and the at least one second scene switching position;

determining at least one segment corresponding to the first scene of the plurality of segments as the first group of frames; and determining at least one segment corresponding to the second scene of the plurality of segments as the second group of frames.

18. The computer program product according to claim 15, wherein determining the dimension comprises:

if the first efficiency/quality parameter is determined to indicate that the conversion efficiency that the first model needs to achieve when performing the conversion exceeds an efficiency threshold, determining the dimension of the first model as a first dimension, the first dimension being less than a first dimension threshold; and/or if the first efficiency/quality parameter is determined to indicate that the conversion quality that the first model needs to achieve when performing the conversion exceeds a quality threshold, determining the dimension of the first model as a second dimension, the second dimension being greater than a second dimension threshold.

19. The computer program product according to claim 15, wherein the method further comprises:

acquiring an input video;

determining a first group of input frames corresponding to a first scene and a second group of input frames corresponding to a second scene in the input video, respectively, the first group of input frames and the second group of input frames each having a first resolution, and the second scene being different from the first scene;

determining a trained first model for the first scene and a trained second model for the second scene, respectively;

generating, based on the first group of input frames and according to the trained first model, a first group of output frames having a second resolution, the second resolution being different from the first resolution; and generating, based on the second group of input frames and according to the trained second model, a second group of output frames having the second resolution.

20. The computer program product according to claim 19, wherein determining the trained first model comprises:

determining at least one trained candidate model for the first scene;

determining a dimension of the trained first model based on a first efficiency/quality parameter, the first efficiency/quality parameter indicating at least one of a conversion efficiency and a conversion quality that the trained first model needs to achieve when performing a conversion from the first group of input frames to the first group of output frames; and selecting the trained first model from the at least one trained candidate model based on the dimension.

* * * * *